(12) United States Patent
Ishida et al.

(10) Patent No.: US 9,421,873 B2
(45) Date of Patent: Aug. 23, 2016

(54) CONSTRUCTION MACHINE

(75) Inventors: Seiji Ishida, Hitachinaka (JP); Masataka Sasaki, Hitachi (JP); Yusuke Kajita, Ushiku (JP); Hidetoshi Satake, Ishioka (JP); Takako Satake, legal representative, Ishioka (JP); Manabu Edamura, Kasumigaura (JP); Kazuo Fujishima, Kasumigaura (JP); Shiho Izumi, Hitachi (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 518 days.

(21) Appl. No.: 13/879,444

(22) PCT Filed: Oct. 12, 2011

(86) PCT No.: PCT/JP2011/073435
§ 371 (c)(1),
(2), (4) Date: Nov. 18, 2013

(87) PCT Pub. No.: WO2012/050133
PCT Pub. Date: Apr. 19, 2012

(65) Prior Publication Data
US 2014/0103874 A1  Apr. 17, 2014

(30) Foreign Application Priority Data

Oct. 15, 2010  (JP) ................................. 2010-232075

(51) Int. Cl.
*H02J 7/00* (2006.01)
*B60L 11/18* (2006.01)
(Continued)

(52) U.S. Cl.
CPC ............ *B60L 11/1809* (2013.01); *B60L 1/003* (2013.01); *B60L 11/14* (2013.01); *B60L 11/1816* (2013.01);
(Continued)

(58) Field of Classification Search
USPC .......................... 320/109, 119, 125, 106, 132
See application file for complete search history.

(56) References Cited

U.S. PATENT DOCUMENTS 5,555,737 A * 9/1996 Takeo ................ B60H 1/00392
62/230
6,172,480 B1 * 1/2001 Vandelac .............. H02J 7/0042
320/119

(Continued)

FOREIGN PATENT DOCUMENTS

JP  2001-11901  1/2001
JP  2007-120109  5/2007

(Continued)

*Primary Examiner* — Brian Ngo
(74) *Attorney, Agent, or Firm* — Baker Botts L.L.P.

(57) ABSTRACT

Construction machine capable of incorporating an engine and using an external power source. The construction machine includes an electrical storage device performing a charge with the external power source, uses the electrical storage device to provide assist when the power of the engine is insufficient, uses an electrical charge in the electrical storage device systematically in accordance with work time, and efficiently uses the electrical storage device by controlling its discharge amount in accordance with load status. The construction machine includes the engine, accessory loads connected to the engine, an assist electric motor driven by the engine, electrical power converters for converting an AC current, which is the output current of the assist electric motor, to a DC current, and the electrical storage device connected to the DC side of each electrical power converter. The electrical storage device becomes charged through a charging device from the external power source.

10 Claims, 9 Drawing Sheets

(51) Int. Cl.
  *E02F 9/20* (2006.01)
  *F02D 29/02* (2006.01)
  *B60L 1/00* (2006.01)
  *B60L 11/14* (2006.01)

(52) U.S. Cl.
  CPC ........... *B60L 11/1862* (2013.01); *E02F 9/2075* (2013.01); *E02F 9/2091* (2013.01); *F02D 29/02* (2013.01); *B60L 2200/40* (2013.01); *B60L 2240/423* (2013.01); *B60L 2240/427* (2013.01); *B60L 2240/547* (2013.01); *B60L 2240/80* (2013.01); *Y02T 10/642* (2013.01); *Y02T 10/70* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 90/14* (2013.01)

(56) References Cited

U.S. PATENT DOCUMENTS

| | | | | |
|---|---|---|---|---|
| 8,886,479 B2 * | 11/2014 | Matsumoto | ........... | B60L 11/123 320/106 |
| 2004/0088103 A1 * | 5/2004 | Itow | ........... | B60K 6/485 701/110 |
| 2010/0096921 A1 * | 4/2010 | Ishida | ........... | H02J 1/102 307/9.1 |
| 2010/0270095 A1 * | 10/2010 | Shono | ........... | E02F 9/2246 180/65.29 |
| 2010/0332088 A1 * | 12/2010 | Okano | ........... | B60K 25/02 701/50 |
| 2011/0093150 A1 * | 4/2011 | Yanagisawa | ........... | B60K 6/365 701/22 |
| 2011/0251746 A1 * | 10/2011 | Wu | ........... | B60K 6/48 701/22 |
| 2011/0270481 A1 * | 11/2011 | Koga | ........... | E02F 9/2058 701/22 |

FOREIGN PATENT DOCUMENTS

| | | |
|---|---|---|
| JP | 2009-13632 | 1/2009 |
| JP | 2009-197514 | 9/2009 |
| JP | 2009-215855 | 9/2009 |
| WO | WO 2010/114036 A1 | 10/2010 |

* cited by examiner

CONSTRUCTION MACHINE

TECHNICAL FIELD

The present invention relates to a construction machine having an engine and an electrical storage device.

BACKGROUND ART

In the past, construction machines such as a hydraulic excavator included an engine-driven hydraulic pump, which drove hydraulic work devices such as a bucket cylinder, an arm cylinder, a boom cylinder, and a travel hydraulic motor.

Further, the construction machines needed to have a high-power engine, which is less fuel efficient than a low-power engine, because it was necessary to significantly vary the power of the engine in order to handle a heavy load imposed during construction work.

However, high-power engines not only exhibit poor fuel efficiency but also cause environmental problems such as those related to exhaust gas and noise.

As such being the case, hybrid construction machines have been proposed in recent years to solve the above problems. These hybrid construction machines include a fuel-efficient low-power engine that generates an average power, and incorporate a technology for using electrical power stored in an electrical storage device to provide electric motor assist for the purpose of compensating for an power shortage caused by the use of the low-power engine.

Further, technologies for making efficient use of an electric motor have been devised. A conventional technology disclosed, for instance, in Patent Document 1 relates to a hybrid construction machine in which an electric motor and a generator are coupled to an engine to store electrical power remaining after light-load work in a battery and extract the electrical power stored in the battery for use during heavy-load work. If work load is not higher than a setting (is light) and the amount of electrical charge stored in an electrical storage device is not smaller than a setting (is large), this technology automatically stops the engine and switches to no engine operation in which the electric motor is driven by using only the electrical power stored in the electrical storage device. Further, if, during the no engine operation, the work load is not lower than the setting or the amount of electrical charge is not larger than the setting, this technology automatically restarts the engine. In other words, this technology makes it possible to keep the amount of electrical charge in the electrical storage device within a predetermined range by steadily operating the engine under light load conditions, that is, in a high-efficiency region, and providing increased energy savings by operating the electric motor to compensate for engine power shortage relative to the work load.

Meanwhile, a technology described in Patent Document 2 prevents an electrical storage device from being excessively charged by charging an electrical storage device with electrical power generated by a generator, which is rotationally driven by an engine, when the amount of electrical charge stored in the electrical storage device is insufficient, and by minimizing the power of the engine to an idling level or stopping the engine when the amount of electrical charge is sufficient.

PRIOR ART LITERATURE

Patent Documents

Patent Document 1: JP-2007-120109-A
Patent Document 2: JP-2001-11901-A

SUMMARY OF THE INVENTION

Problem to be Solved by the Invention

The above-described technologies exercise control to operate the electrical storage device to compensate for engine power shortage relative to the work load for the purpose of steadily operating the engine under light load conditions, namely, in a high-efficiency region, to provide increased energy savings and keeping the amount of electrical charge in the electrical storage device within a predetermined range.

Further, the above-described technologies provide, for example, a regenerative electrical power charging function for charging the electrical storage device with electrical power remaining after light-load work in order to keep the amount of electrical charge in the electrical storage device within a predetermined range.

However, it is known that a lead storage battery used by the present invention as the electrical storage device suffers significant power loss during charging. Therefore, the electrical storage device should preferentially be discharged.

The present invention has been made in view of the above circumstances and has an object to implement electrical storage device control means for exercising control to preferentially cause a discharge so that electrical power stored in an electrical storage device at the beginning of work is used up within work time.

Another object of the present invention is to disclose a technology for using, for example, a commercial power source, which is available at a low energy cost, when the electrical storage device is to be charged in advance.

Objects of the present invention will be described in detail below.

A first object is to implement a plug-in construction machine that is capable of charging an electrical storage device, which is incorporated in the construction machine to assist an engine, through a charging device from a commercial power source or other external power source available at a low energy cost.

A second object is to implement a construction machine that is capable of providing assist by using an electrical storage device, which is incorporated in the construction machine, when an engine power is insufficient in a situation where the electrical storage device is charged by using an external power source, and capable of preventing a failure to provide assist due to an insufficient amount of electrical charge during work and preventing a failure to sufficiently reduce the amount of fuel consumption due to incomplete use of stored electrical charge within work time, that is, capable of setting a target charge amount for the electrical storage device in accordance with the work time in such a manner as to use up the electrical power stored in the electrical storage device within the work time.

A third object is to implement a construction machine that is capable of using an electrical storage device with high efficiency.

Means for Solving the Problem

A configuration defined, for instance, by the appended claims is adopted to achieve the above objects. To achieve the above objects, the present invention includes a plurality of means. According to an aspect of the present invention, there is provided a construction machine including an engine, an assist electric motor, and an electrical power converter. The assist electric motor is coaxially and mechanically connected to the engine. The electrical power converter is connected to the assist electric motor and to an electrical storage device in order to control the voltage of the assist electric motor and the voltage of the electrical storage device. The construction machine includes a charging device connected to the electrical storage device, the electrical storage device being capable of becoming charged through the charging device from an external power source.

According to another aspect of the present invention, there is provided a construction machine including an engine, an assist electric motor, and an electrical power converter. The assist electric motor is coaxially and mechanically connected to the engine. The electrical power converter is connected to the assist electric motor and to an electrical storage device in order to control the voltage of the assist electric motor and the voltage of the electrical storage device. A target charge amount for the electrical storage device is determined in accordance with estimated work time of the construction machine. A charge/discharge amount is then controlled in accordance with the target charge amount.

Effects of the Invention

The present invention makes it possible to implement a construction machine that is capable of incorporating an engine and using an external power source. The present invention also makes it possible to implement a construction machine that is capable of providing assist by using an electrical storage device when an engine power is insufficient, and capable of efficiently charging and discharging the electrical storage device during work to use up the whole amount of electrical charge at the end of work.

MODE FOR CARRYING OUT THE INVENTION

A first embodiment of the present invention will now be described with reference to FIGS. 1 to 6 and 9. The following description is given without considering device efficiency in order to provide better understanding of the present embodiment. It should be noted, however, that control can be exercised with increased accuracy when the device efficiency is taken into consideration.

Figure 1:
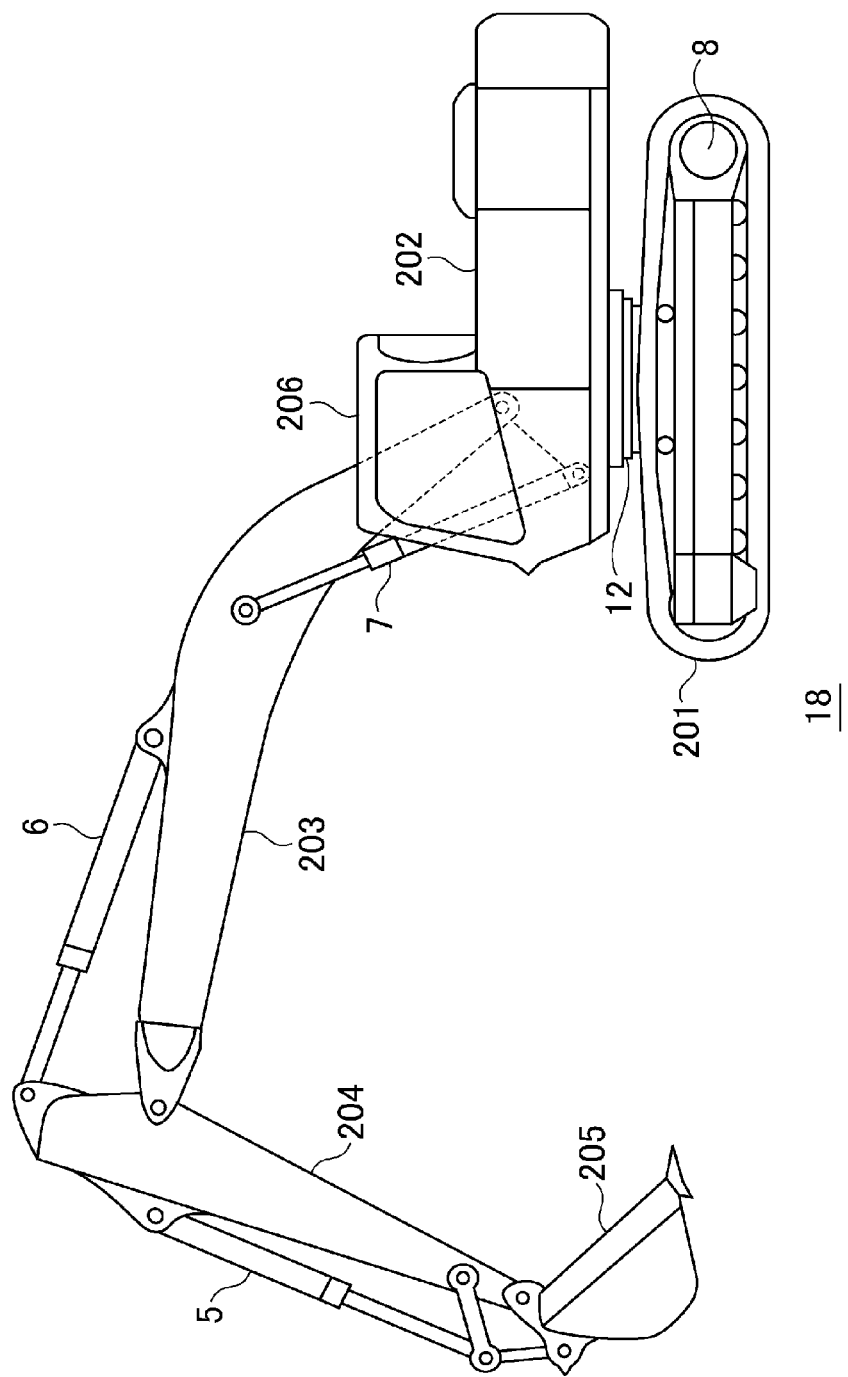
FIG. 1 is an external view of a construction machine according to the present invention.

FIG. 1 is a diagram illustrating the configuration of a hydraulic excavator (a representative example of a construction machine) to which the present embodiment is applied. Referring to FIG. 1, the hydraulic excavator 18 includes a travel structure 201 and a swing structure 202.

The travel structure 201 has a function of allowing a travel hydraulic motor 8 to run the construction machine.

A swing mechanism 12 causes the swing structure 202 to rotate relative to the travel structure 201. A boom 203, an arm 204, and a bucket 205, which perform excavating operations, are disposed on the other side of the front of the swing structure 202 (e.g., on the right side as viewed from the back of the construction machine).

The boom 203, the arm 204, and the bucket 205 are respectively driven by a boom cylinder 7, an arm cylinder 6, and a bucket cylinder 5. The swing structure 202 includes a cab 206. An operator gets into the cab 206 to operate the construction machine.

Figure 2:
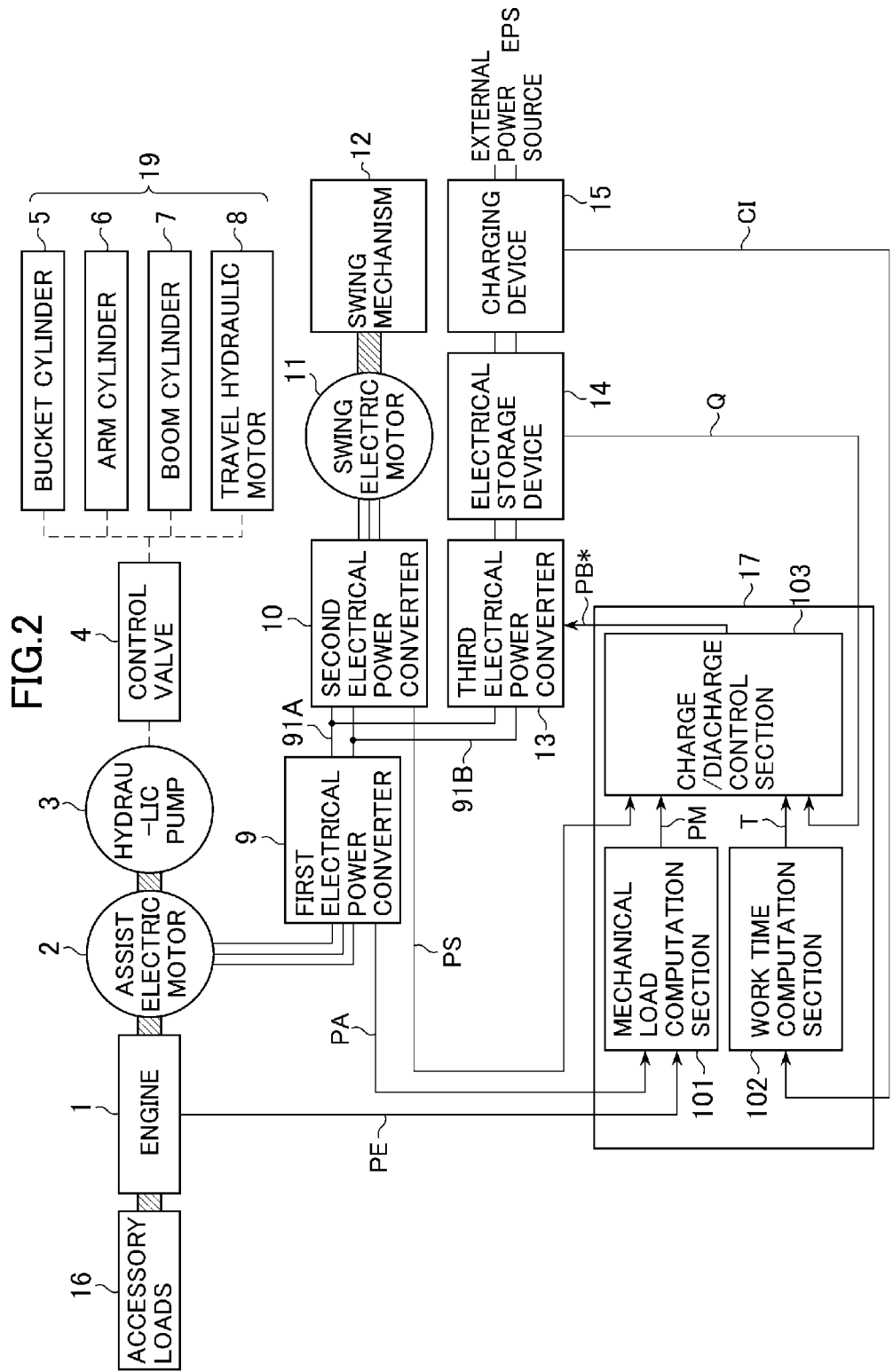
FIG. 2 is a diagram illustrating the overall configuration of a drive system according to a first embodiment of the present invention.

FIG. 2 shows the overall configuration of a construction machine drive system that drives the construction machine shown in FIG. 1.

The drive system includes an engine 1, an assist electric motor 2, a hydraulic pump 3, a control valve 4, the bucket cylinder 5, the arm cylinder 6, the boom cylinder 7, the travel hydraulic motor 8, electrical power converters 9, 10, 13, a swing electric motor 11, the swing mechanism 12, an electrical storage device 14, a charging device 15, accessory loads 16, and a control device 17.

The rotation speed of the engine 1 is controlled in accordance with a target rotation speed that is set by the operator. The engine 1 is mechanically coupled to the assist electric motor 2.

The accessory loads 16, such as a fan and an air-conditioner compressor, are mechanically coupled to the engine 1 and connected to the assist electric motor 2 through the engine 1.

The hydraulic pump 3 is connected to the assist electric motor 2, which is mechanically coupled to the engine 1. The hydraulic pump 3 is driven by the motive power of the engine 1 and of the assist electric motor 2 to supply a hydraulic fluid to the control valve 4. In accordance with a control lever operated by the operator, the control valve 4 controls the hydraulic fluid to be supplied to the bucket cylinder 5, the arm cylinder 6, the boom cylinder 7, and the travel hydraulic motor 8.

During a power running period, the assist electric motor 2 assists the engine 1 so that the motive power of the engine 1 and of the assist electric motor 2 drives the hydraulic pump 3 and the accessory loads 16. During a regeneration period, the assist electric motor 2 allows the engine 1 to generate electrical power. Hydraulic work devices, namely, the bucket cylinder 5, the arm cylinder 6, the boom cylinder 7, and the travel hydraulic motor 8, are mounted on the swing structure 202 and on the travel structure 201.

The first electrical power converter 9 is connected to the assist electric motor 2 to convert a DC voltage to an AC voltage and convert an AC voltage to a DC voltage. In other words, the AC voltage generated by the assist electric motor 2 is converted to a DC voltage through the first electrical power converter 9.

The second electrical power converter 10 is connected to the DC side of the first electrical power converter 9.

As is the case with the first electrical power converter 9, the second electrical power converter 10 converts a DC voltage to an AC voltage and converts an AC voltage to a DC voltage.

The swing electric motor 11 is connected to the AC side of the second electrical power converter 10. The rotation speed and torque of the swing electric motor 11 can be controlled through the first and second electrical power converters 9, 10 in accordance with information about the control lever operated by the operator. The swing mechanism 12 is connected to the swing electric motor 11 and driven through the swing electric motor 11.

The first and second electrical power converters 9, 10 are interconnected through a DC bus 91A. The third electrical power converter 13 is connected to the DC bus 91A through a DC bus 91B.

The voltages of the DC buses 91A, 91B are converted by the third electrical power converter 13. The electrical storage device 14 is connected to a side from which a DC current obtained by voltage conversion is output. A lead storage battery may be used as the electrical storage device 14.

The electrical storage device 14 is connected to the charging device 15.

The charging device 15 is connectable to an external power source EPS. The charging device 15 can receive an electrical current from the external power source EPS, convert it from AC to DC, and convert it to a voltage that can be used to charge the electrical storage device 14. It means that the electrical storage device 14 can be charged from the external power source EPS.

As the above-described configuration is employed, a commercial external power source available at a low energy cost can be used to charge the electrical storage device 14 during rest time during which no work is performed. If, for instance, work is conducted during daytime but no work is conducted during nighttime, it is conceivable that the electrical storage device 14 may be charged during nighttime by connecting it to the external power source EPS, and that the electrical power stored in electrical storage device 14 may be used for daytime work. Hence, if the power required for work exceeds an engine power by a short period of time, additional power can be supplied from the electrical storage device 14. Therefore, it is demanded that the engine 1 be able to provide an engine power appropriate for average work power. Consequently, an engine having a small capacity can be used. Small-capacity engines are available at a low price and highly efficient under normal conditions. As a result, it is expected that cost reduction is achievable.

The control device 17 is connected through communication means to the engine 1, the first electrical power converter 9, the second electrical power converter 10, the third electrical power converter 13, the electrical storage device 14, and the charging device 15.

The control device 17 includes a mechanical load computation section 101, a work time computation section 102, and a charge/discharge control section 103.

An engine power PE is input from the engine 1 to the control device 17 through the communication means. An assist electric motor mechanical power PA is input from the first electrical power converter 9 to the control device 17 through the communication means. A swing electric motor mechanical power PS, a charge amount Q of the electrical storage device 14, and charge information CI about the charging device 15 are input from the second electrical power converter 10 to the control device 17 through the communication means. The control device 17 outputs a computed charge/discharge command PB* to the third electrical power converter 13. The third electrical power converter 13 controls the charge/discharge amount PB of the electrical storage device 14 until it agrees with the charge/discharge command PB* output from the control device 17 by performing mutual electrical power conversion between the DC bus 91B and the electrical storage device 14. Hence, the charge/discharge of the electrical storage device 14 is controllable. If the charge/discharge command PB* is a positive value, it discharges the electrical storage device 14. If, on the other hand, the charge/discharge command PB* is a negative value, it charges the electrical storage device 14.

Methods of computing the charge/discharge command PB* that are used by the mechanical load computation section 101, the work time computation section 102, and the charge/discharge control section 103, which are included in the control device 17, will now be described.

The engine power PE and the assist electric motor mechanical power PA are input to the mechanical load computation section 101. The mechanical load computation section 101 uses Equation (1) to compute a mechanical load PM that corresponds to a load handled by the hydraulic pump 3 and the accessory loads 16.

$$PM = PE + PA \quad (1)$$

The work time computation section 102 computes the work time T of the construction machine by adding the charge information CI derived from the charging device 15 to the time at which the construction machine is activated. The work time T is reset when the electrical storage device 14 is fully charged from the external power source EPS.

Further, the swing electric motor mechanical power PS, the mechanical load PM, the work time T, and the charge amount Q of the electrical storage device 14 are input to the charge/discharge control section 103. The charge/discharge control section 103 then outputs the charge/discharge command PB* to the third electrical power converter 13.

Figure 3:
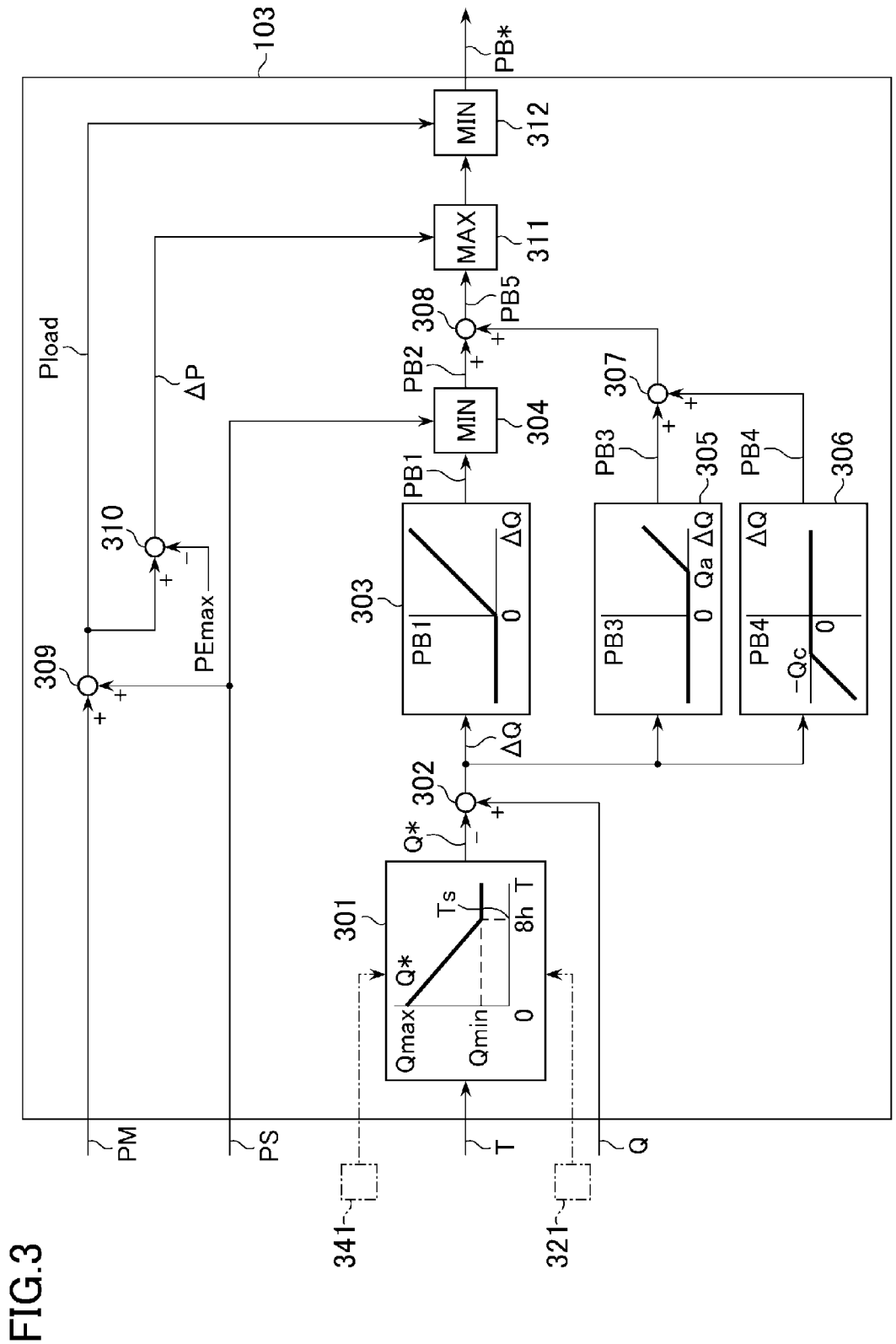
FIG. 3 is a diagram illustrating the configuration of a charge/discharge control section according to the first embodiment.

The method used by the charge/discharge control section 103 to compute the charge/discharge command PB* will now be described in detail with reference to FIG. 3.

The charge/discharge control section 103 includes a charge amount target value computation section 301, subtractors 302, 310, a first charge/discharge target value computation section 303, minimum value computing units 304, 312, a second charge/discharge target value computation section 305, a third charge/discharge target value computation section 306, adders 307, 308, 309, and a maximum value computing unit 311.

The charge amount target value computation section 301 computes a charge amount target value Q* in accordance with the work time T of the construction machine and with predefined estimated work time Ts. The charge amount target value Q* is preset to the maximum charge amount Qmax of the electrical storage device 14 when the work time T is zero and preset to the minimum charge amount Qmin when the work time T represents the end of work. The charge amount target value Q* monotonically decreases with the work time T.

As the present invention exercises control so that the charge amount Q agrees with the characteristics of the charge amount target value Q*, the electrical power stored in the electrical storage device can be systematically used. This makes it possible to prevent a failure to provide assist due to an insufficient amount of electrical charge during work and prevent a failure to sufficiently reduce the amount of fuel consumption due to incomplete use of stored electrical charge at the end of work. Thus, the electrical storage device can be not only efficiently used, but also reduced in size.

In the present embodiment, it is assumed that the estimated work time Ts is eight hours, which is regarded as average work time. However, when common work time is taken into consideration, it is appropriate that the estimated work time Ts be set within a range of 6 to 10 hours. Further, work time setup means 321 may be provided to permit the operator to set appropriate estimated work time Ts as desired. If the estimated work time Ts is set before the beginning of work, the characteristics of the charge amount target value computation section 301 are changed in accordance with the work time so that the charge amount target value Q* agrees with the minimum charge amount Qmin after the elapse of the estimated work time Ts. Even if the estimated work time Ts is changed during work, the characteristics of the charge amount target value computation section 301 are changed in accordance with elapsed time and remaining work time so that the charge amount target value Q* for the set work time Ts agrees with the minimum charge amount Qmin. Although the operator sets the work time, the remaining work time can also be set. Further, even if a clock function and work end time setup means which allows the operator to set the work end time are provided instead of the work time setup means, the same functionality can be implemented by computing the work time from the time and the work end time. In this case, too, the employed configuration may be such that the work end time can be changed during work. Moreover, it is also possible to incorporate a function of providing enhanced work time calculation accuracy by inputting an interruption time zone such as a lunch break.

First of all, the adder 302 subtracts the charge amount target value Q* from the charge amount Q of the electrical storage device 14 to compute a charge amount allowance value ΔQ for the purpose of exercising control to ensure that the charge amount Q of the electrical storage device 14 agrees with the characteristics of the charge amount target value Q*.

Next, the first charge/discharge target value computation section 303 receives the input of the charge amount allowance value ΔQ from the adder 302 to compute a first charge/discharge target value PB1. The first charge/discharge target value PB1 represents a discharge amount based on the charge amount allowance value ΔQ. When the charge amount allowance value ΔQ is smaller than 0 (zero), the first charge/discharge target value PB1 is 0 (zero). When the charge amount allowance value ΔQ is not smaller than 0 (zero), the first charge/discharge target value PB1 causes a discharge so that the charge amount Q agrees with the charge amount target value Q*.

Further, the minimum value computing section 304 receives the input of the computed first charge/discharge target value PB1 and the swing electric motor mechanical power PS, and outputs the smaller of these two values as a second charge/discharge target value PB2. In other words, the minimum value computing section 304 outputs a value that is obtained when the swing electric motor mechanical power PS is an upper-limit value.

Meanwhile, the second charge/discharge target value computation section 305 computes a third charge/discharge target value PB3 in accordance with the charge amount allowance value ΔQ. The third charge/discharge target value PB3 is 0 (zero) when the charge amount allowance value ΔQ is smaller than a predetermined first charge amount allowance setting Qa. When the charge amount allowance value ΔQ is not smaller than the first charge amount allowance setting Qa, the third charge/discharge target value PB3 is a discharge target value for causing a discharge so that the charge amount Q is equal to Q*+Qa, which represents a value greater than the charge amount target value Q*.

Further, the third charge/discharge target value computation section 306 computes a fourth charge/discharge target value PB4 in accordance with the charge amount allowance value ΔQ. The fourth charge/discharge target value PB4 is 0 (zero) when the charge amount allowance value ΔQ is greater than a predetermined second charge amount allowance setting −Qc. When the charge amount allowance value ΔQ is not greater than the second charge amount allowance setting −Qc, the fourth charge/discharge target value PB4 is a charge target value for causing a charge so that the charge amount Q is equal to Q*−Qc, which represents a value smaller than the charge amount target value Q*.

After the third charge/discharge target value PB3 and the fourth charge/discharge target value PB4 are computed as described above, the sum of these target values is calculated by the adder 307.

The above calculated sum is then input to the adder 308, added to the second charge/discharge target value PB2 to obtain a fifth charge/discharge target value PB5.

Meanwhile, the adder 309 receives the input of the mechanical load PM and the swing electric motor mechanical power PS, adds these two values together, and outputs the resulting sum as a total power Pload, which represents the power required for the entire drive system.

Further, the subtractor 310 computes an engine power shortage amount ΔP by subtracting the maximum power PEmax of the engine from the total power Pload calculated by the adder 309. If the engine power shortage amount ΔP is a positive value, the maximum power PEmax of the engine is not sufficient for the total power Pload. If, on the other hand, the engine power shortage amount ΔP is a negative value, it means that the engine's maximum power is more than necessary.

The engine power shortage amount ΔP and the fifth charge/discharge target value PB5, which are computed as described above, are input to the maximum value computing unit 311. The maximum value computing unit 311 outputs the greater of these two values. In other words, the maximum value computing unit 311 outputs a value that is obtained when the engine power shortage amount ΔP is a lower-limit value.

Similarly, the minimum value computing unit 312 receives the value output from the maximum value computing unit 311 and the total power Pload, and outputs the smaller of these two values as the charge/discharge amount PB. In other words, a value obtained when the total power Pload is an upper-limit value is output as the charge/discharge command PB*.

In short, the fifth charge/discharge target value PB5 is used to output the charge/discharge command PB*, which is obtained when the engine power shortage amount ΔP is a lower-limit value and the total power Pload is an upper-limit value, through the maximum value computing unit 311 and the minimum value computing unit 312. The charge/discharge command PB* is then input to the third electrical power converter 13.

The third electrical power converter 13 is connected to the electrical storage device 14. Therefore, the third electrical power converter 13 can charge or discharge the electrical storage device 14 through the third electrical power converter in compliance with the input charge/discharge command.

The reason why the charge/discharge command PB* is limited with respect to the fifth charge/discharge target value PB5 will now be described with reference to FIG. 9.

Figure 9:
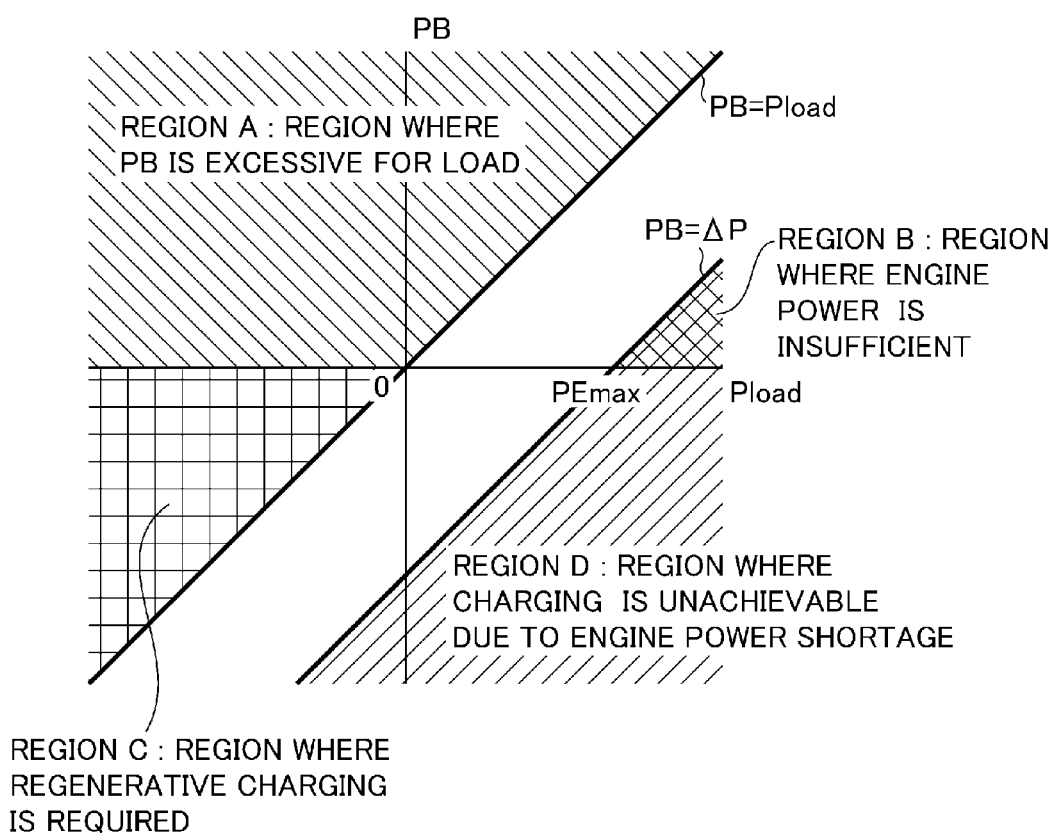
FIG. 9 is a diagram illustrating a system status with respect to the total power and the charge/discharge amount PB.

FIG. 9 shows a system status with respect to the total power Pload and the charge/discharge amount PB. Region A is a region where the charge/discharge amount PB is excessive and excessive power results even when the engine power PE is 0 (zero). Region B is a region where the charge/discharge amount is insufficient and the total power Pload cannot be obtained even when the engine power PE is the engine's maximum power PEmax. Region C is a region where the charge/discharge amount is insufficient and excessive power is obtained even when the engine power PE is 0 (zero). Region D is a region where the charge/discharge amount PB is excessive and the total power Pload and the charge amount cannot be obtained even when the engine power PE is the engine's maximum power PEmax. As it is necessary to ensure that the charge/discharge amount PB is outside regions A to D, the charge/discharge command PB* is limited as described earlier.

The flow of electrical power that is supplied to various sections (power flow) in the drive system when the above-described charge/discharge command is received will now be described.

As is obvious from Equation (1), the engine power PE is in balance with the assist electric motor mechanical power PA and with the mechanical load PM. When the operator manipulates the control lever to increase the mechanical load PM, the rotation speed of the engine 1 temporarily decreases; however, the rotation speed of the engine 1 is controlled to satisfy Equation (1) so that the engine power PE increases until the amount of increase in the mechanical load PM is in balance with the amount of increase in the engine power PE. Therefore, the engine power PE satisfies Equation (2) except for a short transient period. In other words, even if the mechanical load PM increases or decreases when the operator manipulates the control lever, an appropriate engine power PE is generated. The same holds true when the assist electric motor mechanical power PA increases or decreases.

$$PE=PM-PA \quad (2)$$

Further, the first electrical power converter 9 controls the voltage of the DC bus 91A between the first electrical power converter 9 and the second electrical power converter 10. Therefore, control is exercised so that the assist electric motor mechanical power PA is in balance with the swing electric motor mechanical power PS and with the charge/discharge amount PB.

If, for instance, the voltage of the DC bus 91A temporarily decreases in a situation where the swing electric motor mechanical power PS is increased, the assist electric motor mechanical power PA decreases due to voltage control exercised by the first electrical power converter 9. In other words, while power running is in progress, an assist amount decreases to decrease the power supplied from the DC bus to a mechanical system. On the other hand, while regeneration is in progress, the amount of power generation increases to increase the power supplied from the mechanical system. Thus, the assist electric motor mechanical power PA is calculated from Equation (3) except for a short transient period. In other words, even when the swing electric motor mechanical power PS increases or decreases due to a swing operation, the assist electric motor mechanical power PA is adjusted accordingly. Further, as the engine power PE is determined from Equation (2) as described earlier in accordance with an increase or decrease in the assist electric motor mechanical power PA, the engine power PE is generated in accordance with the swing operation. The same holds true when the electrical storage device 14 performs a charge/discharge through the third electrical power converter 13 to increase or decrease the charge/discharge amount PB. When a discharge is performed, the engine power PE decreases by an amount equivalent to the amount of discharge. When, on the other hand, a charge is performed, the engine power PE increases by an amount equivalent to the amount of charge.

$$PA=PB-PS \quad (3)$$

An operation performed by the charge/discharge control section 103 will now be described with reference to an exemplary operation depicted in FIG. 6.

Figure 6:
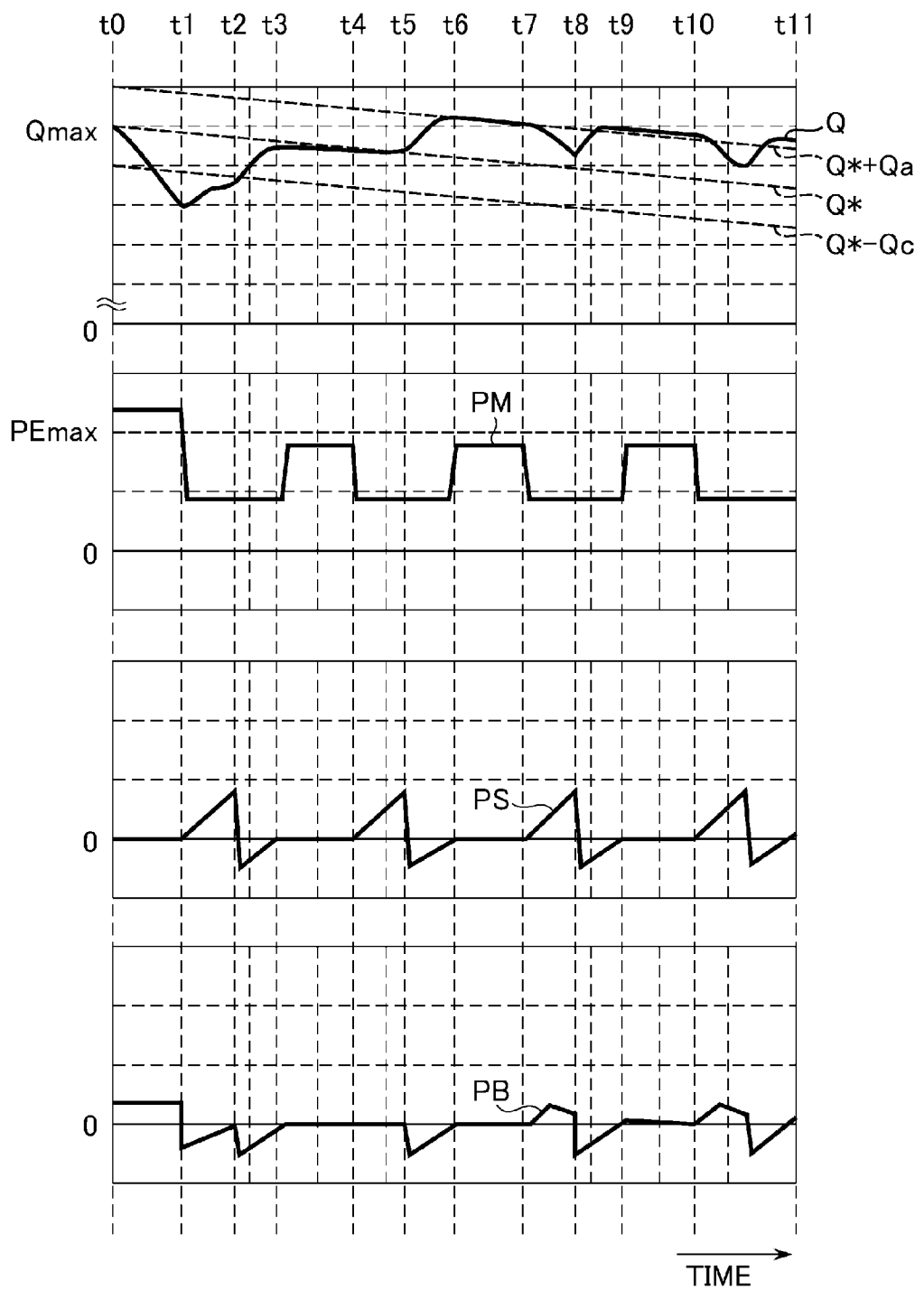
FIG. 6 is a diagram illustrating an exemplary operation of the drive system according to the first embodiment.

FIG. 6 is a timing diagram illustrating the relationship of the charge amount target value Q*, the charge amount Q, the mechanical load PM, the swing electric motor mechanical power PS, and the charge/discharge amount PB to time.

Here, it is assumed that the initial values of the charge amount Q and the work time T are the maximum charge amount Qmax and 0 (zero), respectively. The mechanical load PM and the swing electric motor mechanical power PS are output as shown in the figure when the operator manipulates the control lever.

First of all, at time t0, that is, when the work time T=0 (zero), the charge amount target value Q* calculated by the charge amount target value computation section 301 agrees with the maximum charge amount Qmax. Therefore, the charge amount allowance value ΔQ, which is the difference between the charge amount target value Q* and the charge amount Q, is 0 (zero).

Consequently, as described with reference to FIG. 3, the first charge/discharge target value PB1, the third charge/discharge target value PB3, and the fourth charge/discharge target value PB4 are 0 (zero).

Further, as the swing electric motor mechanical power PS is 0 (zero), the second charge/discharge target value PB2 is 0 (zero) and the fifth charge/discharge target value PB5 is also 0 (zero).

However, the mechanical load PM is higher than the engine's maximum power PEmax, that is, the total power Pload is higher than the engine's maximum power PEmax. Therefore, the engine power shortage amount ΔP, which is a lower-limit value of the charge/discharge command PB*, is a positive value. Thus, the charge/discharge command PB* is the engine power shortage amount ΔP. Hence, the electrical storage device 14 can be discharged to compensate for the shortage of the engine's maximum power PEmax relative to the mechanical load PM.

Although the charge amount target value Q* decreases with time, the charge amount Q of the electrical storage device 14 more rapidly decreases due to its discharge than the charge amount target value Q*. Therefore, the charge amount allowance value ΔQ is a negative value and the fifth charge/discharge target value PB5 is 0 (zero) or a negative value. Hence, the charge/discharge command PB* represents the engine power shortage amount ΔP.

Next, at time t1, it is assumed that the mechanical load PM decreases to accelerate the swing electric motor 11, which has been stopped, thereby gradually increasing the swing electric motor mechanical power PS. In this instance, the charge amount Q is smaller than Q*−Qc. Therefore, the charge amount allowance value ΔQ is smaller than −Qc. Thus, the fourth charge/discharge target value PB4 and the fifth charge/discharge target value PB5 are negative values (charging) so that the charge amount allowance value ΔQ is equal to Q*−Qc. Meanwhile, the engine power shortage amount ΔP is a negative value because the total power Pload is lower than the engine's maximum power PEmax due to a decrease in the mechanical load PM. Therefore, the fifth charge/discharge target value PB5 is output as is as the charge/discharge command PB*. The electrical storage device 14 is then charged so that the charge amount Q, which has been excessively decreased, is equal to Q*−Qc. As described above, when the charge amount Q is smaller than Q*−Qc and significantly insufficient relative to the charge amount target value Q*, the electrical storage device 14 is charged as needed to control the charge amount Q until it is equal to Q*−Qc, which is in a neighborhood of the charge amount target value Q*.

At time t2, the swing electric motor 11 switches to decelerate so that the swing electric motor mechanical power PS changes to a negative value (regeneration). Subsequently, the speed of the swing electric motor 11 begins to decrease. In this instance, the second charge/discharge target value PB2 is limited by the swing electric motor mechanical power PS so that the swing electric motor mechanical power PS is a negative value (charging). The charge/discharge command PB* also represents the swing electric motor mechanical power PS. Further, even when the charge amount Q is larger than Q*−Qc so that the fourth charge/discharge target value PB4 is 0 (zero), a charge is continuously performed in accordance with the second charge/discharge target value PB2. This ensures that the electrical power regenerated by the swing electric motor 11 can be charged into the electrical storage device 14.

At time t3, the mechanical load PM increases without exceeding the engine's maximum power PEmax. This causes the swing electric motor 11 to stop so that the swing electric motor mechanical power PS is 0 (zero). As the charge amount Q is between Q*−Qc and Q* and the charge amount allowance value ΔQ is between −Qc and 0 (zero), the first charge/discharge target value PB1, the third charge/discharge target value PB3, and the fourth charge/discharge target value PB4 are 0 (zero). Further, as the swing electric motor mechanical power PS is 0 (zero), the second charge/discharge target value PB2 is 0 (zero). Hence, the fifth charge/discharge target value PB5 is 0 (zero). Furthermore, as the mechanical load PM and the total power Pload are not higher than the engine's maximum power PEmax, the charge/discharge command PB* is 0 (zero) without being limited. Thus, the charge amount Q remains unchanged.

At time t4, the mechanical load PM decreases to increase the swing electric motor mechanical power PS, as is the case with time t1. Further, when the charge amount Q is not smaller than the charge amount target value Q*, the charge amount allowance value ΔQ is not smaller than 0 (zero). This causes the first charge/discharge target value PB1 to be a positive value (discharging). The charge/discharge command PB* then becomes a positive value (discharging) while the swing electric motor mechanical power PS is used as an upper limit. Eventually, the electrical storage device 14 is discharged so that the charge amount Q agrees with the charge amount target value Q*.

At time t5, the swing electric motor mechanical power PS changes to a negative value (regeneration), as is the case with time t2. The charge/discharge command PB* then becomes a negative value (charging), as is the case with time t2. Hence, an operation is performed to charge the electrical storage device 14 with the electrical power regenerated by the swing electric motor 11.

At time t6, the mechanical load PM increases without exceeding the engine's maximum power PEmax until the swing electric motor mechanical power PS is 0 (zero), as is the case with time t3. In this instance, as the swing electric motor mechanical power PS is 0 (zero), the second charge/discharge target value PB2 is 0 (zero). However, as the charge amount Q is not smaller than Q*+Qa, the charge amount allowance value ΔQ is not smaller than Qa so that the third charge/discharge target value PB3 is a positive value (discharging). Hence, the charge/discharge command PB* is a positive value (discharging). As a result, the electrical storage device 14 is discharged so that the charge amount Q is equal to Q*+Qa.

At time t7, the mechanical load PM decreases to increase the swing electric motor mechanical power PS, as is the case with time t1. As the charge amount Q is not smaller than Q*+Qa, the charge amount allowance value ΔQ is not smaller than Qa. As the third charge/discharge target value PB3 is a positive value (discharging) and the first charge/discharge target value PB1 is also a positive value (discharging), the second charge/discharge target value PB2, which is limited by the swing electric motor mechanical power PS, is also a positive value (discharging). Hence, the charge/discharge command PB* is a positive value (discharging) greater than the swing electric motor mechanical power PS. Thus, the electrical storage device 14 is discharged. In this instance, the amount of discharged electrical power is larger than used by the swing electric motor 11. As the discharged electrical power is higher than the swing electric motor mechanical power PS, the assist electric motor 2 assists the engine 1 through the first electrical power converter 9.

When the charge amount Q is smaller than Q+Qa due to discharging, the third charge/discharge target value PB3 is 0 (zero). The charge/discharge command PB* agrees with the swing electric motor mechanical power PS. The amount of electrical power used by the swing electric motor 11 is discharged from the electrical storage device 14. Subsequently, when the swing electric motor mechanical power PS exceeds the first charge/discharge target value PB1 due to an increase in the swing electric motor mechanical power PS, the first charge/discharge target value PB1 is output as the charge/discharge command PB*. As a result, the electrical storage device 14 is discharged so that the charge amount Q agrees with the charge amount target value Q*.

When, at time t8, the swing electric motor mechanical power PS switches to a negative value (regeneration), as is the case with time t5, the charge/discharge command PB* is a negative value (charging), as is the case with time t5. Hence, an operation is performed to charge the electrical storage device 14 with the electrical power regenerated by the swing electric motor 11.

When the charge amount Q is not smaller than Q*+Qa due to charging, the third charge/discharge target value PB3 is a positive value so that the charge/discharge command PB* is higher than the swing electric motor mechanical power PS. This ensures that part of the electrical power regenerated by the swing electric motor 11 is not charged into the electrical storage device 14. This part of the electrical power, which is not used to charge the electrical storage device 14, is supplied to the assist electric motor 2 through the first electrical power converter 9 to assist the engine 1.

The operation performed at and after time t9 will not be described because it is the same as the operation performed at and after time t6.

The above-described operation is summarized below.

When the total power Pload is higher than the engine's maximum power PEmax, the resulting power shortage is covered by discharging the electrical storage device 14 as indicated by the operation performed at time t0 to time t1.

If, on the other hand, the swing electric motor mechanical power PS is a negative value so that the swing electric motor 11 regenerates electrical power, the regenerative electrical power is basically charged into the electrical storage device 14 as indicated by the operation performed at time t2 to time t3.

The operation performed relative to the charge amount Q is described below. If the charge amount Q is not larger than Q*−Qc, the charge amount is significantly insufficient relative to the charge amount target value Q*. Therefore, it is necessary to perform a charge operation in order to obtain electrical power required for an operation whose total power Pload is higher than the engine's maximum power PEmax. Consequently, control is exercised as indicated by the operation performed at time t1 to time t2 so that the charge amount Q is equal to $Q^*-Qc$. If the charge amount Q is between $Q^*-Qc$ and $Q^*$, a wait is performed without conducting a charge/discharge operation as indicated by the operation performed at time t3 to time t4 until the charge amount target value $Q^*$ decreases with time except when the aforementioned engine power shortage amount is positive or when regenerative electrical power is generated. If the charge amount Q is between $Q^*$ and $Q^*+Qa$ and if the amount of fuel consumption by the engine 1 is significantly decreased by discharging the electrical storage device 14, it is preferred that a discharge operation be performed.

An effect of reducing the power of the engine 1 by discharging the electrical storage device 14 will now be described with reference to FIGS. 4 and 5.

Figure 4:
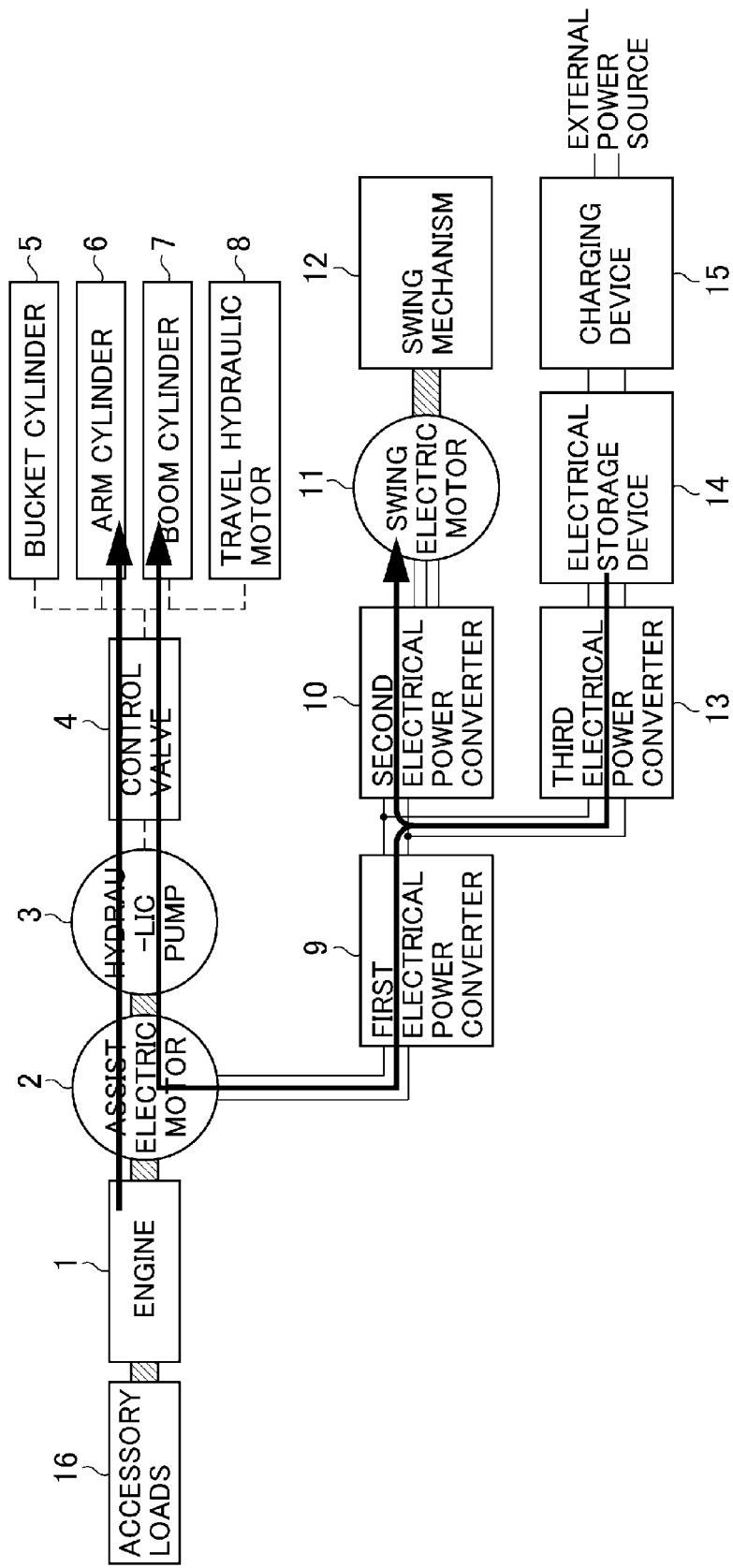
FIG. 4 is a diagram illustrating the flow of power in a situation where the discharge amount of an electrical storage device is larger than a swing electric motor power.

FIG. 4 shows a case where the charge/discharge command PB* is higher than the swing electric motor mechanical power PS. In this instance, the assist electric motor 2 performs a power running operation and the electrical storage device 14 is discharged to provide assist and cover energy shortage.

Figure 5:
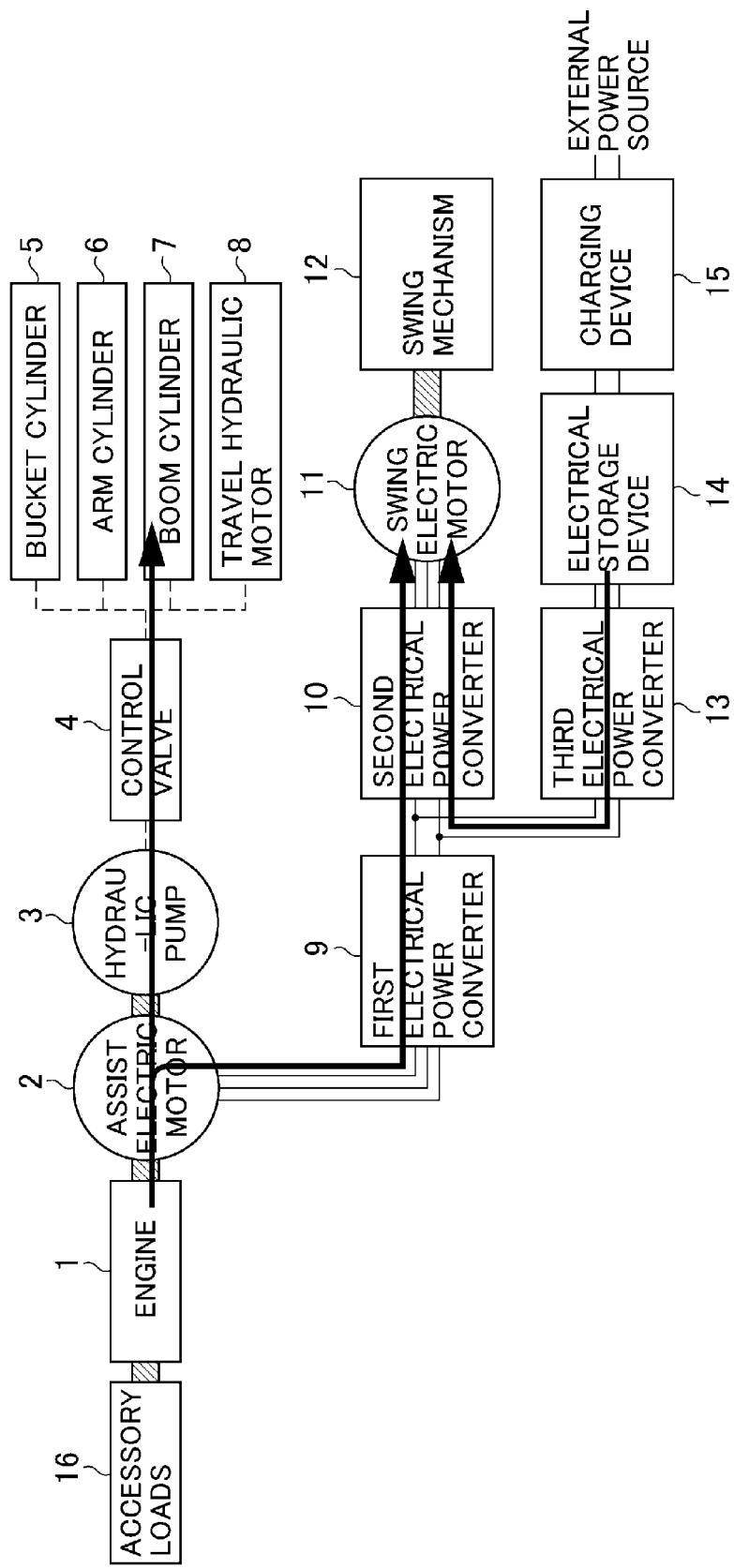
FIG. 5 is a diagram illustrating the flow of power in a situation where the discharge amount of the electrical storage device is smaller than a swing electric motor power.

Meanwhile, FIG. 5 shows a case where the charge/discharge command PB* is lower than the swing electric motor mechanical power PS. In this instance, the assist electric motor 2 performs a regeneration operation.

As shown in FIG. 4, the following power flows exist when driving the hydraulic pump 3. In one power flow, the electrical power discharged from the electrical storage section 14 drives the hydraulic pump 3 through the third electrical power converter 13, the first electrical power converter 9, and the assist electric motor 2. In another power flow, the engine 1 directly drives the hydraulic pump 3 through the assist electric motor 2. If device efficiency is taken into consideration, the number of intervening devices is large when the electrical power discharged from the electrical storage device 14 is used to drive the hydraulic pump 3. This increases the conversion loss in electrical power or in motive power. Therefore, the power of the engine needs to be increased to compensate for the conversion loss. As a result, the effect of reducing the amount of fuel consumption by the engine is diminished.

Meanwhile, the power flows shown in FIG. 5 relate to a case where the electrical storage device 14 supplies electrical power to the swing electric motor 11 through the third electrical power converter 13 and the second electrical power converter 10 or relate to a case where the engine 1 supplies electrical power to the swing electric motor 11 through the assist electric motor 2, the first electrical power converter 9, and the second electrical power converter 10. If device efficiency taken into consideration, the number of intervening devices is small when the electrical power discharged from the electrical storage device 14 is supplied to the swing electric motor 11. Further, the conversion loss in electrical power or in motive power is insignificant. Therefore, the power of the engine does not need to be increased to compensate for the conversion loss. As a result, the effect of reducing the amount of fuel consumption by the engine is great.

Consequently, a greater effect of reducing the engine's fuel consumption is obtained when the electrical storage device 14 is discharged so as to follow the power flows shown in FIG. 5, that is, to make the charge/discharge command PB* lower than the swing electric motor mechanical power PS. Therefore, as indicated, for instance, by the operation performed at time t7 to time t8, the effect of reducing the amount of fuel consumption by the engine 1 with respect to the charge amount can be increased by preventing the charge/discharge command PB* from exceeding the swing electric motor mechanical power PS.

When the charge amount Q is not smaller than $Q^*+Qa$, the charge amount is excessive relative to the charge amount target value $Q^*$. In this instance, a certain electrical charge remains in the electrical storage device 14 at the end of work. It means that the amount of fuel consumption by the engine 1 is not sufficiently reduced. Therefore, even when the power flows shown in FIG. 4 exist, that is, the charge/discharge command PB* is higher than the swing electric motor mechanical power PS, it is necessary to reduce the fuel consumption by discharging the electrical storage device 14. Consequently, as indicated by the operation performed at time t6 to time t7, control is exercised so that the charge amount Q agrees with $Q^*+Qa$.

In the above-described embodiment, it is assumed that the estimated work time Ts set in the charge amount target value computation section 301 is 8 hours. However, setup change means may be provided to let the operator manipulate, for instance, a control button to change the estimated work time setting Ts. The setup change means is preferably provided in the cab 206 so that it can be manipulated by the operator. The estimated work time input by the operator is input to the control device 17 or preferably the charge amount target value computation section 301 of the charge/discharge control section 103 through the communication means. Therefore, even when the estimated work time is changed, the electrical storage device can be systematically used in accordance with the changed estimated work time. This makes it possible to prevent a failure to effectively use an available charge amount when the work time is short and prevent a failure to obtain a charge amount necessary for providing assist when the work time is long.

In an environment in which the electrical storage device cannot be charged by using an external power source, an operation can be performed without decreasing the charge amount of the electrical storage device by providing a setup change button or other setup change means 341 for permitting the operator to specify whether or not to perform a charge and switching to a fixed charge amount target value $Q^*$. The setup change means 341 for specifying whether or not to perform a charge is preferably provided in the cab 206 so that it can be manipulated by the operator. Information input by the operator to specify whether or not to perform a charge is input to the control device 17 through the communication means. In this case, too, it is possible to perform a discharge in order to provide assist when the engine power is insufficient and charge the electrical power regenerated by the swing electric motor 11 into the electrical storage device for reuse. Consequently, the amount of fuel consumption can be reduced. Further, if the rest time is longer than a predetermined period of time and no charge has been performed by using an external power source in a situation where no setup means is available to the operator, it can be concluded that the current environment does not permit the use of the external power source to charge the electrical storage device. In this instance, an operation can be performed without decreasing the charge amount of the electrical storage device by switching to a fixed charge amount target value $Q^*$ in the same manner as described above.

Further, in the above-described embodiment, it is assumed that only the swing electric motor is used as a motorized device for supplying electrical power to the electrical storage device through a DC bus. Alternatively, however, another electrical load may be used as well. When such an alternative configuration is employed, control can be exercised in the same manner by adding the electrical power of such an electrical load to the swing electric motor mechanical power PS.

A second embodiment of the present invention will now be described with reference to FIGS. 7 and 8. As is the case with the first embodiment, the following description is given without considering device efficiency in order to provide better understanding of the second embodiment. Like elements in the first and second embodiments are designated by the same reference signs and will not be redundantly described.

Figure 7:
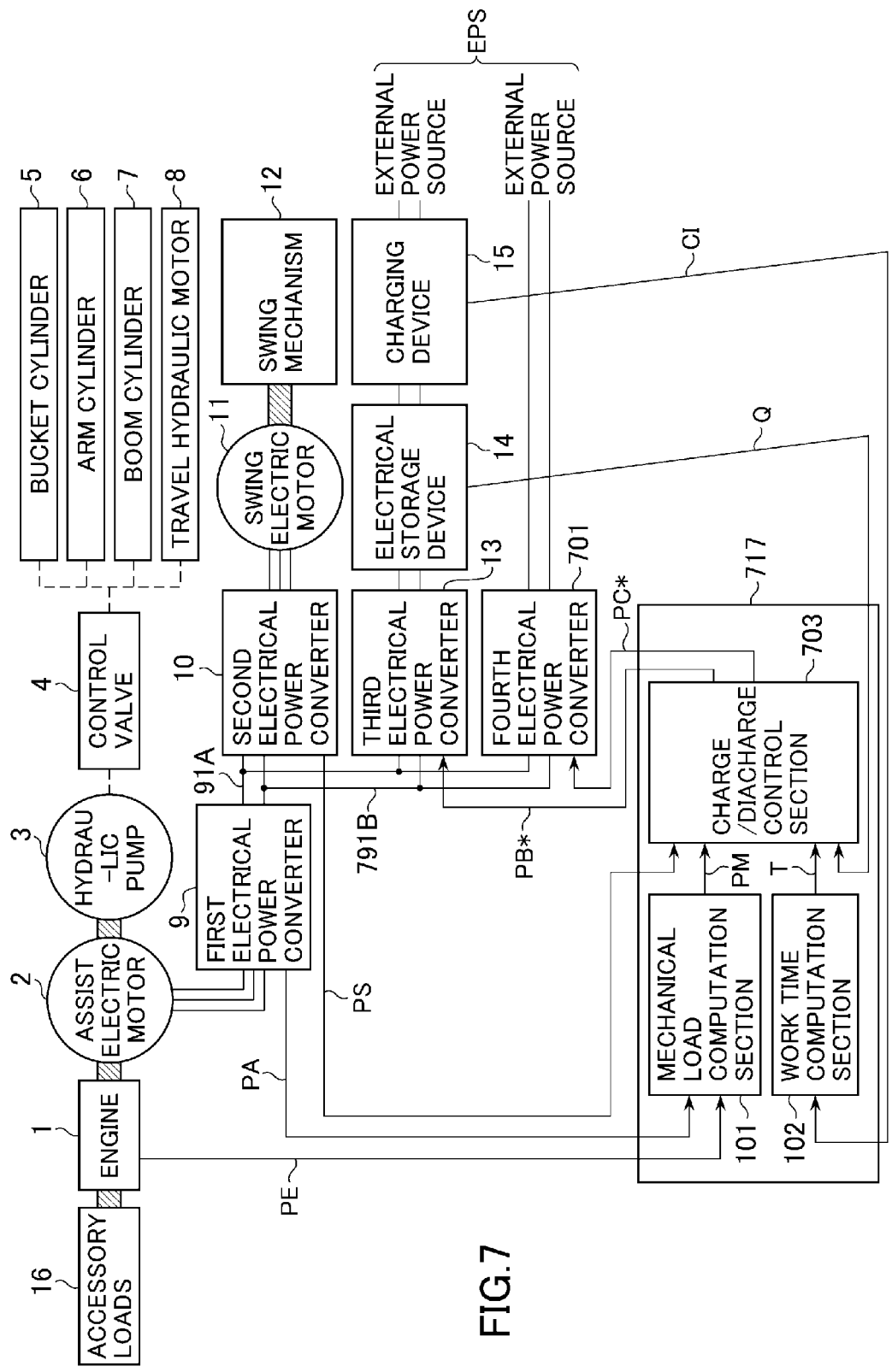
FIG. 7 is a diagram illustrating the overall configuration of the drive system according to a second embodiment of the present invention.
Figure 8:
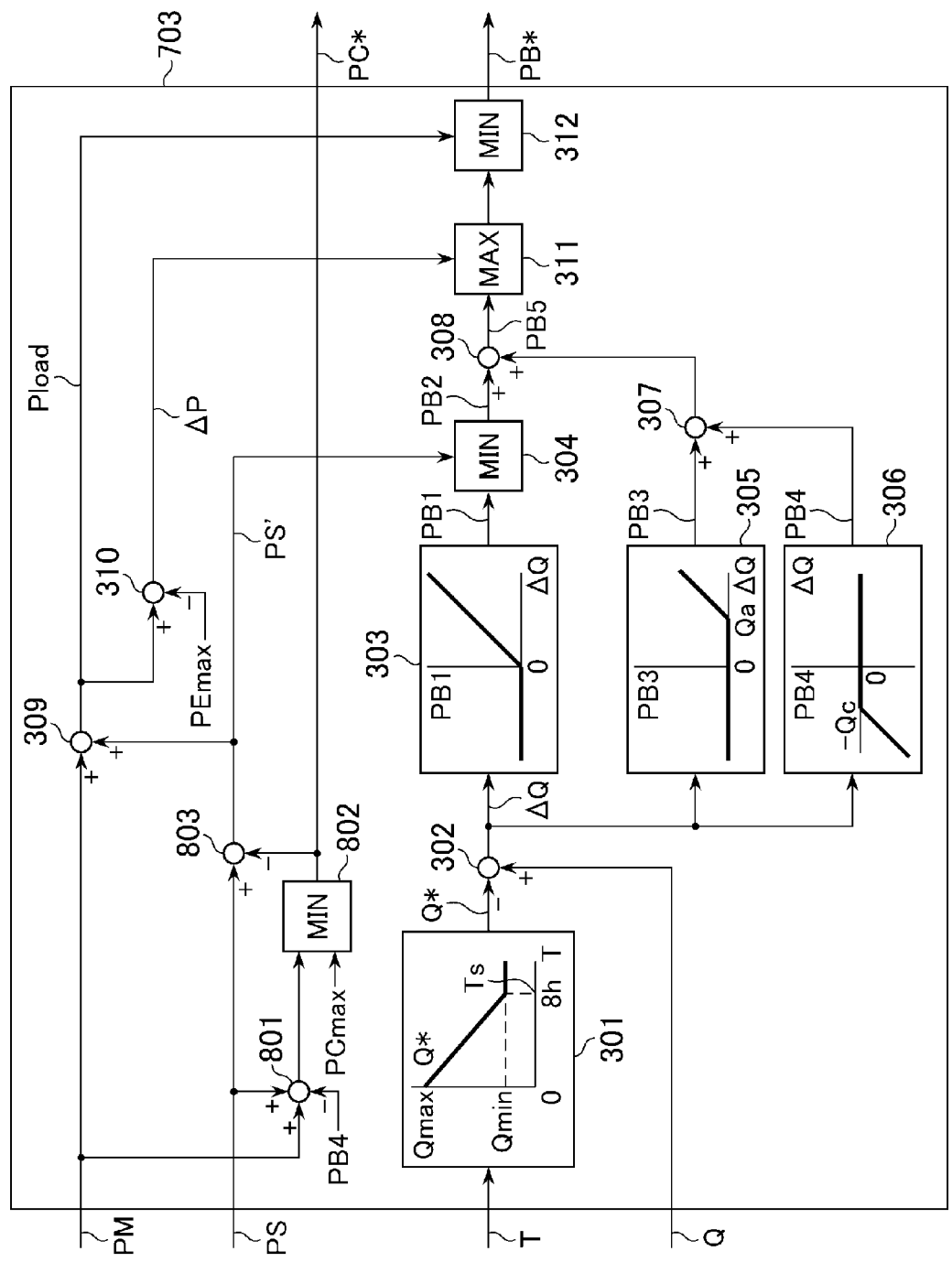
FIG. 8 is a diagram illustrating the configuration of the charge/discharge control section according to the second embodiment.

FIG. 7 shows the overall configuration of the drive system for the construction machine.

The drive system according to the second embodiment differs from the drive system shown in FIG. 1 in that a fourth electrical power converter 701 is added and that a control device 717 is included in place of the control device 17.

The fourth electrical power converter 701, the first electrical power converter 9, and the second electrical power converter 10 are interconnected through the DC buses 91A, 91B, which are DC side circuits, to convert the voltage of electrical power supplied from the external power source EPS. The electrical power supplied from the external power source EPS is forwarded through the fourth electrical power converter 701 and supplied to various sections through the DC buses 91A, 91B in compliance with a constant power feed command PC*. The capacity of the supplied electrical power is smaller than the maximum power PEmax of the engine 1.

The control device 717 includes a charge/discharge control section 703 instead of the charge/discharge control section 103, which is included in the control device 17 shown in FIG. 1. The charge/discharge control section 703 receives the input of the swing electric motor mechanical power PS, mechanical load PM, and work time T, receives the input of the charge amount Q from the electrical storage device 14, outputs the charge/discharge command PB* to the third electrical power converter 13, and outputs the constant power feed command PC* to the fourth electrical power converter 701.

The charge/discharge control section 703 will now be described in detail with reference to FIG. 8. The charge/discharge control section 703 differs from the charge/discharge control section 103 shown in FIG. 3 in that an adder-subtractor 801, a minimum value computing unit 802, and a subtractor 803 are added. The adder-subtractor 801 subtracts the fourth charge/discharge target value PB4 from the sum of the mechanical load PM and the swing electric motor mechanical power PS. The minimum value computing unit 802 compares the value calculated by the adder-subtractor 801 to a maximum constant power feed amount PCmax of the fourth electrical power converter 701 and outputs the smaller of these two values as the constant power feed command PC*.

Consequently, a portion equivalent to a power requested by the system can be supplied from the external power source when the power requested by the system is smaller than the maximum constant power feed amount PCmax. Further, the constant power feed command PC* can be supplied from the external power source when the power requested by the system is larger than the maximum constant power feed amount PCmax. As this ensures that electrical power is supplied within the capacity of the fourth electrical power converter 710 wherever possible, the amount of fuel consumption by the engine 1 can be minimized.

The subtractor 803 subtracts the constant power feed command PC* from the swing electric motor mechanical power PS and outputs a corrected swing electric motor mechanical power PS', which is to be used in place of the swing electric motor mechanical power PS of the charge/discharge control section 103. The reason is that the electrical power supplied from the fourth electrical power converter 701 is equivalent in terms of a DC bus load to the swing electric motor mechanical power PS minus the supplied electrical power. This makes it necessary for the subtractor 803 to consider the electrical power supplied from the fourth electrical power converter 701.

The drive system for the construction machine according to the second embodiment is equivalent to a system in which the electrical power consumption of the swing electric motor 11 is decreased by the amount of supplied electrical power when the swing electric motor 11 is performing a power running operation and the regenerative electrical power of the swing electric motor 11 is increased by the amount of supplied electrical power when the swing electric motor 11 is performing a regeneration operation. Therefore, the second embodiment provides the same charge/discharge control of the electrical storage device 14 and the same advantages as the first embodiment.

The second embodiment also provides an advantage of being capable of reducing the fuel consumption of the engine by allowing external electrical power to be supplied within the range of a power requested by the system. Further, as an engine is incorporated, it is possible to not only use a small-capacity electrical power converter as the fourth electrical power converter 701, but also perform an operation even when an external power feed is not provided.

DESCRIPTION OF REFERENCE SYMBOLS

1 . . . Engine
2 . . . Assist electric motor
3 . . . Hydraulic pump
4 . . . Control valve
5 . . . Bucket cylinder
6 . . . Arm cylinder
7 . . . Boom cylinder
8 . . . Travel hydraulic motor
9 . . . First electrical power converter
10 . . . Second electrical power converter
11 . . . Swing electric motor
12 . . . Swing mechanism
13 . . . Third electrical power converter
14 . . . Electrical storage device
15 . . . Charging device
17, 717 . . . Control device
18 . . . Hydraulic excavator
19 . . . Hydraulic work device
91A, 91B . . . DC bus (DC side circuit)
101 . . . Mechanical load computation section
102 . . . Work time computation section
103 . . . Charge/discharge control section
201 . . . Travel structure
202 . . . Swing structure
203 . . . Boom
204 . . . Arm
205 . . . Bucket
206 . . . Cab
301 . . . Charge amount target value computation section
303 . . . First charge/discharge target value computation section
305 . . . Second charge/discharge target value computation section
306 . . . Third charge/discharge target value computation section
321 . . . Work time setup means
341 . . . Setup change means (mode setup means)
701 . . . Fourth electrical power converter
CI . . . Charge information EPS . . . External power source
PA . . . Assist electric motor mechanical power
PB . . . Charge/discharge amount
PB* . . . Charge/discharge command
PB1 to PB5 . . . First to fifth charge/discharge target values
PCmax . . . Maximum constant power feed amount
PC* . . . Constant power feed command
PE . . . Engine power
PEmax . . . Engine's maximum power
Pload . . . Total power
PM . . . Mechanical load
PS . . . Swing electric motor mechanical power
PS' . . . Corrected swing electric motor mechanical power
Q . . . Charge amount
Q* . . . Charge amount target value
ΔQ . . . Charge amount allowance value
T . . . Work time
Ts . . . Estimated work time (setting)

The invention claimed is:

1. A construction machine having an engine, an assist electric motor that is coaxially and mechanically connected to the engine, and an electrical power converter that is connected to the assist electric motor and to an electrical storage device in order to control the voltage of the assist electric motor and the voltage of the electrical storage device, the construction machine comprising:
a charging device connected to the electrical storage device, the electrical storage device being capable of becoming charged through the charging device from an external power source (EPS); and
charge-discharge control means for:
determining a charge amount target value (Q*) for the electrical storage device in accordance with estimated work time (Ts) of the construction machine; and
controlling a charge/discharge amount by charging the electrical storage device when a charge amount (Q) of the electrical storage device is lower than a first threshold value determined using the charge amount target value (Q*) and discharging the electrical storage device when the charge amount (Q) of the electrical storage device exceeds a second threshold value determined using the charge amount target value (Q*), wherein the charge amount target value (Q*) is set to be equal to a minimum charge amount (Qmin) of the electrical storage device at the end of work time period,
wherein the charge/discharge control means includes a charge amount target value computation section that computes the charge amount target value (Q*) for the electrical storage device in accordance with work time (T) of the construction machine and with the predefined estimated work time (Ts), and a charge/discharge target value computation section that discharges the electrical storage device when the charge amount (Q) of the electrical storage device is larger than the second threshold value that is a charge amount (Q*+Qa) determined in accordance with the charge amount target value (Q*) and with a predetermined value (Qa), and charges the electrical storage device when the charge amount (Q) of the electrical storage device is smaller than the first threshold value that is a charge amount (Q*−Qc) determined in accordance with the charge amount target value (Q*) and with a predetermined value (Qc).

2. The construction machine according to claim 1, further comprising:
external power feed means for receiving electrical power from the external power source (EPS) and supplying the electrical power to a DC side circuit of the electrical power converter.

3. The construction machine according to claim 1, further comprising:
setup means capable of setting the estimated work time (Ts).

4. The construction machine according to claim 1, wherein the estimated work time (Ts) is six to ten hours.

5. The construction machine according to claim 1, further comprising:
setup means for selecting a mode that specifies whether or not to perform a charge from the external power source (EPS);
wherein a method of exercising charge/discharge control over the electrical storage device changes in accordance with the selected mode.

6. The construction machine according to claim 1, further comprising:
setup means for selecting a mode that specifies whether or not to perform a charge from the external power source (EPS);
wherein the charge amount target value (Q*) changes in accordance with the selected mode.

7. The construction machine according to claim 5, wherein, when a predefined period of time elapses after the construction machine stops operating and the construction machine starts up while the electrical storage device is not being charged by the external power source (EPS), the construction machine switches to a mode in which the external power source (EPS) does not perform a charge.

8. The construction machine according to claim 1, wherein the charge amount target value (Q*) is set to be equal to a maximum charge amount (Qmax) of the electrical storage device at the beginning of work and equal to the minimum charge amount (Qmin) of the electrical storage device at the end of work.

9. A construction machine having an engine, an assist electric motor that is coaxially and mechanically connected to the engine, and an electrical power converter that is connected to the assist electric motor and to an electrical storage device in order to control the voltage of the assist electric motor and the voltage of the electrical storage device, the construction machine comprising:
a charging device connected to the electrical storage device, the electrical storage device being capable of becoming charged through the charging device from an external power source (EPS); and
charge-discharge control means for:
determining a charge amount target value (Q*) for the electrical storage device in accordance with estimated work time (Ts) of the construction machine; and
controlling a charge/discharge amount by charging the electrical storage device when a charge amount (Q) of the electrical storage device is lower than a first threshold value determined using the charge amount target value (Q*) and discharging the electrical storage device when the charge amount (Q) of the electrical storage device exceeds a second threshold value determined using the charge amount target value (Q*), wherein the charge amount target value (Q*) is set to be equal to a minimum charge amount (Qmin) of the electrical storage device at the end of work time period,
wherein the charge/discharge control means includes a charge amount target value computation section that computes the charge amount target value (Q*) for the electrical storage device in accordance with work time (T) of the construction machine and with the predefined estimated work time (Ts), and a charge/discharge target value computation section that charges/discharges the electrical storage device in accordance with the charge amount target value (Q*), and wherein the charge/discharge target value computation section discharges the electrical storage device when the charge amount (Q) of the electrical storage device is larger than a charge amount (Q*+Qa) determined in accordance with the charge amount target value (Q*) and with a predetermined value (Qa), causes the electrical storage device to discharge electrical power smaller than the power consumption (PS) of an electrically-driven device of the construction machine when the charge amount (Q) of the electrical storage device is larger than the charge amount target value (Q*), and charges the electrical storage device when the charge amount (Q) of the electrical storage device is smaller than a charge amount (Q*−Qc) determined in accordance with the charge amount target value (Q*) and with a predetermined value (Qc).

10. A construction machine having an engine, an assist electric motor that is coaxially and mechanically connected to the engine, and an electrical power converter that is connected to the assist electric motor and to an electrical storage device in order to control the voltage of the assist electric motor and the voltage of the electrical storage device, the construction machine comprising:

a charging device connected to the electrical storage device, the electrical storage device being capable of becoming charged through the charging device from an external power source (EPS); and charge-discharge control means for:
  determining a charge amount target value (Q*) for the electrical storage device in accordance with estimated work time (Ts) of the construction machine; and
  controlling a charge/discharge amount by charging the electrical storage device when a charge amount (Q) of the electrical storage device is lower than a first threshold value determined using the charge amount target value (Q*) and discharging the electrical storage device when the charge amount (Q) of the electrical storage device exceeds a second threshold value determined using the charge amount target value (Q*), wherein the charge amount target value (Q*) is set to be equal to a minimum charge amount (Qmin) of the electrical storage device at the end of work time period;

setup means for selecting a mode that specifies whether or not to perform a charge from the external power source (EPS);

wherein a method of exercising charge/discharge control over the electrical storage device changes in accordance with the selected mode, and wherein, when a predefined period of time elapses after the construction machine stops operating and the construction machine starts up while the electrical storage device is not being charged by the external power source (EPS), the construction machine switches to a mode in which the external power source (EPS) does not perform a charge.

* * * * *